Feb. 23, 1971 JAMES E. WEBB 3,566,268
ADMINISTRATOR OF THE NATIONAL AERONAUTICS
AND SPACE ADMINISTRATION
RAPID SYNC-ACQUISTION SYSTEM
Filed Feb. 9, 1968 2 Sheets-Sheet 1

TAGE O. ANDERSON
ALBERT J. GALLO
INVENTORS

BY

ATTORNEYS

Feb. 23, 1971 JAMES E. WEBB 3,566,268
ADMINISTRATOR OF THE NATIONAL AERONAUTICS
AND SPACE ADMINISTRATION
RAPID SYNC-ACQUISTION SYSTEM
Filed Feb. 9, 1968 2 Sheets-Sheet 2

TAGE O. ANDERSON
ALBERT J. GALLO
*INVENTORS*

BY J. H. Warden
G. McCoy

ATTORNEYS

United States Patent Office 3,566,268

Patented Feb. 23, 1971

3,566,268

RAPID SYNC-ACQUISITION SYSTEM

James E. Webb, Administrator of the National Aeronautics and Space Administration with respect to an invention of Tage O. Anderson, Arcadia, and Albert J. Gallo San Diego, Calif.

Filed Feb. 9, 1968, Ser. No. 704,299

Int. Cl. H04b *1/00*

U.S. Cl. 325—41 7 Claims

ABSTRACT OF THE DISCLOSURE

A system is disclosed for reducing sync-acquisition time in a data communication system, in which synchronization is achieved as a function of the phase correlation of a PN code, generated in a ground station and received by a spacecraft, and a similar PN code which is generated in the spacecraft. The system includes circuitry which is incorporated in the spacecraft to sample the phase of the PN code generated therein and to communicate the phase of the sampled code to the ground station, via a telemetry channel. At the ground station, the phase of the sampled spacecraft PN code is used to set a ground PN code generator to a state so that when the ground PN code is transmitted to and arrives at the spacecraft, it is substantially in phase with the PN code, generated therein.

ORIGIN OF INVENTION

The invention described herein was made in the performance of work under a NASA contract and is subject to the provisions of Section 305 of the National Aeronautics and Space Act of 1958, Public Law 85–568 (72 Stat. 435; 42 USC 2457).

BACKGROUND OF THE INVENTION

(1) Field of the invention

This invention generally relates to digital data communication circuitry and, more particularly, to a system for reducing the time required to obtain synchronization in a data communication system, which utilizes pesudonoise (PN) codes for signal synchronization.

(2) Description of the prior art

In space exploration data communication systems PN codes, which have favorable correlation properties, are utilized in conjunction with a phase-lock loop to provide necessary sync signals. Several systems, while utilize such codes, have been described in the literature as well as in issued U.S. patents. One example of a prior art publication is U.S. Patent No. 3,305,636, entitled "Phase-Shift Data Transmission System Having a Pseudo-Noise SYNC Code Modulated With the Data in a Single Channel," issued Feb. 21, 1967. Several prior art publications, related to the use of the PN codes for synchronizing purposes, are referred to in the specification of said patent.

In the basic technique of obtaining synchronizing signals, or simply sync, with the PN codes, a unique PN code is generated by a generator in a ground station. A code generator, capable of generating the same PN code, is included in a spacecraft. Sync is obtained in the spacecraft by cross correlating the PN code, generated in the spacecraft with the PN code, received from the ground station. If the received PN code is not in phase with the PN code generated in the spacecraft, the correlation will result in a signal of minimal amplitude. This signal is supplied to a voltage-controlled oscillator (VCO). The latter is controlled to vary its output frequency which is used to clock the code generator in the spacecraft. Once the phase of the spacecraft PN code coincides with the phase of the received PN code, as indicated by a maximum signal from the correlator, phase-lock is achieved and maintained by the phase-lock loop which controls the spacecraft generator by means of the frequency from its VCO.

In some communication systems, the code generator at the ground station is manipulated until the code received at the spacecraft is in phase with the local code, generated therein. Once such phase lock is achieved, the phase-lock loop in the spacecraft causes the spacecraft generator to track the received PN code. In other systems the spacecraft code generator is manipulated. Irrespective, however, of which code generator is manipulated during the sync-acquisition period, the amount of time required to synchronize the two codes, i.e., to acquire sync, is determined by the system's signal-to-noise ratio, the slip rate between the two frequencies that clock the two code generators, and most importantly the initial phase difference between the PN code generated in the spacecraft, and the one received thereat, when the system is first turned on or after system failure. Some present systems require from 0 seconds to approximately 12 minutes to obtain synchronization or phase-lock of the two PN codes.

This is primarily due to the fact that, at turn on time, the phase of the PN code in the spacecraft is not known, and therefore, the phase of the PN code which is generated in the ground station at turn on time, is completely independent of the phase of the spacecraft PN code. If at turn on time, it happens, that the ground PN code starts at a phase, so that when the code is received in the spacecraft it is nearly in phase with the spacecraft PN code then, very few seconds are required to obtain phase-lock. On the other hand, if the phase of the ground code at turn on time is such that, when it is received in the spacecraft it is completely out of phase with the spacecraft PN code, a long sync-acquisition period is required. This is most undesirable, since, during such a period, data communicated between the spacecraft and the ground station can not be properly interpreted.

OBJECTS AND SUMMARY OF THE INVENTION

It is a primary object of the present invention to provide a system for minimizing sync-acquisition time in a data communication system of the general type discussed herebefore.

Another object of the invention provides a relatively simple, though highly significant arrangement for use in a data communication system to reduce the time required to obtain sync, after system turn on.

A further object of this invention is to provide addition to an otherwise conventional data communication system in which PN codes are utilized, in order to reduce sync-acquisition time.

Still a further object of the invention is to provide means, in an otherwise conventional data communication system, with which the action of a spacecraft PN code can be observed at a ground station and thereby view the actual acquisition of sync.

These and other objects of the invention are achieved by a system or an arrangement which is based on the recognition that sync-acquisition time can be greatly reduced if the phase of the ground PN code is controlled, as a function of the phase of the spacecraft PN code, rather than being independent thereof. The arrangement of the present invention includes simple circuitry which is added to the communication system in the spacecraft, as well as in the ground station.

In the spacecraft, circuits are added to sample the phase of the spacecraft PN code at a defined instant in time. This information, i.e., the spacecraft code phase, is transmitted to the ground station, wherein circuitry is added, to receive the sampled phase of the spacecraft code and to control the ground code generator with it. It is appreciated that time is required to process the sampled information and that time elapses when signals are communicated from the spacecraft to the ground station and back to the spacecraft. The ground code generator is further controlled to account for such time parameters, so that when the PN code which is generated in the ground code generator and transmitted to the spacecraft reaches the craft, it is nearly in phase with the PN code, which is generated in the spacecraft. Consequently, a very short period is required to obtain phase-lock.

Briefly stated, in accordance with the present invention, the phase of the spacecraft PN code is sampled and communicated to the ground station. Therein, this information, together with calculated signal-processing and propagation time parameters, the ground station code generator is controlled so that the PN code provided thereby and thereafter transmitted to the spacecraft, arrives at the latter substantially in phase wih the PN code, which is generaed therein.

The novel features of the invention are set forth with particularity in the appended claims. The invention will best be understood from the following description when read in conjunction with the accompanying drawings.

DESCRIPTION OF THE PREFERRED EMBODIMENTS

Figure 1:
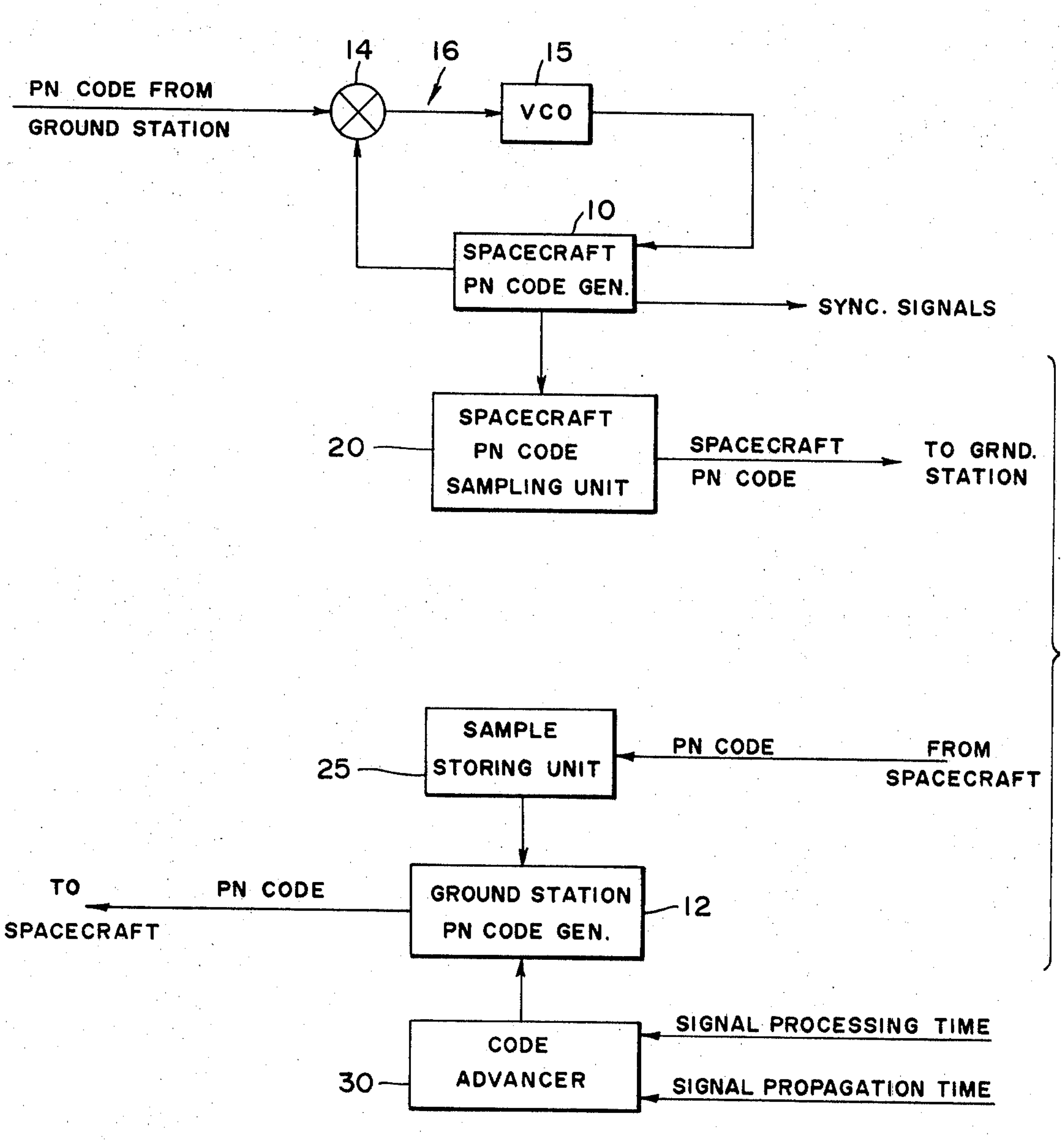
FIG. 1 is a simplified block diagram of the arrangement of the present invention.

Reference is now made to FIG. 1, which is a simplified block diagram of the basic arrangement of the present invention. In the figure, various control signals are purposely not shown, in order to simplify the figure and the following explanation and thereby highlight the novel features of the invention. Block 10 represents a spacecraft PN code generator, while block 12 represents a ground station PN code generator. Both are designed to produce identical codes which, as is appreciated by those familiar with the art, each code consists of a unique multibit sequence of a fixed length. For explanatory purposes, let it be assumed that the period of the PN code or sequence is one second.

As in a conventional data communication system, utilizing PN codes for synchronization, the spacecraft code generator 10 is connected to a correlator 14 which is also supplied with the PN code received from the ground station. The output of correlator 14 is supplied to a voltage-controlled oscillator (VCO) 15, which together with correlator 14 comprise a phase-lock loop 16. The output signals from the VCO are used to clock generator 10. The frequency of these signals is controlled by the phase-lock loop, so that the code, generated in generator 10, is in phase with the received ground code. Generator 10 provides sync signals used in the spacecraft's data channel (not shown) to decode received data. However, the decoding is only meaningful when the sync signals are provided by generator 10, whose PN code is in phase with the ground received PN code.

In accordance with the teachings of the present invention, a spacecraft code sampling unit 20 is incorporated in the spacecraft. Unit 20 is connected to generator 10. The function of unit 20 is to sample the state or phase of the PN code in generator 10 at a controlled instant in time, arbitrarily defined as $t_0$, and to transfer the sampled code to the telemetry system (not shown) aboard the spacecraft for communication to the ground station.

In the ground station the sampled PN code, which is received from the spacecraft, is transferred and stored in a sample storing unit 25. After the entire code sample is stored, at a second controlled instant in time, the content of unit 25 is transferred to generator 12, so that the code therein is actually the sampled code from the spacecraft code generator 10.

Assuming for a moment that signal processing time and signal transmission or propagation time are both zero, synchronization of the two codes in the spacecraft would be achieved instantaneously. That is, with zero signal processing and propagation time delay, the sampled code of generator 10 at $t_0$ would arrive at the ground station at $t_0$. It would instantaneously be stored in unit 25 and at the same instant set generator 12. Its code would then be transmitted and received at the spacecraft at the same instant in time, i.e., $t_0$. Thus, both PN codes at correlator 14 would be in phase.

It is appreciated, however, that such idealistic conditions do not exist in practice. Consequently, it is necessary to account for the signal processing and propagation time, that is, the total time from the instant, such as $t_0$, when the spacecraft code is sampled to the instant when the adjusted ground code is received at the correlator 14. This is achieved in the present invention by a code advancer 30 which is coupled to the generator 12 in the ground station.

Basically, after the sampled code in unit 25 is transferred to generator 12, setting the code therein to correspond to the sampled code, received from the spacecraft, the code advancer 30 is provided with one signal representing the delay time due to all signal processing, and another signal representing total signal propagation time (from spacecraft to ground and back to spacecraft). On the basis of these signals, the code advancer supplies the generator 12 with a number of high frequency clocking signals to advance the phase of the PN code in the generator. The advanced code is then transmitted to the spacecraft, so that when it is received therein, it is in phase with the PN code from generator 10.

The code advancer 30 may include a counter which is set to a count corresponding to the total processing and propagation time in order to control the number of high frequency clocking signals which have to be supplied to the generator 12 to properly advance the code therein. For example, if the total propagation time is $t_x$ seconds and the processing time $t_y$ seconds, the total time delay may be expressed as $T=t_x+t_y$ seconds. By multiplying T by N, which is assumed to represent the number of symbols or bits in the PN sequence, the number of required high frequency clocking signals is determined. It should be noted that since, as herebefore assumed, the code or sequence period is one second, only the fractional second portion of T need be multiplied by N. Defining such fractional second-portion by $T_f$, the total number of required high frequency clocking signals is X, where $X=T_f \cdot N$. If, for example, T is determined to be 10.5 seconds, and N equals 265 bits, $X=0.5\times256=128$. Thus, by quickly supplying generator 12 with 128 clocking signals, the code would be advanced by half its sequence, so that when arriving at the spacecraft, it would be in phase with the code from generator 10.

In some applications, it may be preferable to advance the code with less than the optimum number of clocking signals and thereby purposely introduce a small phase difference between the two codes. Such phase difference would be corrected by the phase-lock loop 16 within a few seconds. Thus, by using the present invention sync-acquisition time is reduced to a maximum of only a few seconds. Furthermore, it should be pointed out that this time would be substantially fixed, since it would be a function of the phase difference which is purposely introduced between the two codes.

Figure 2:
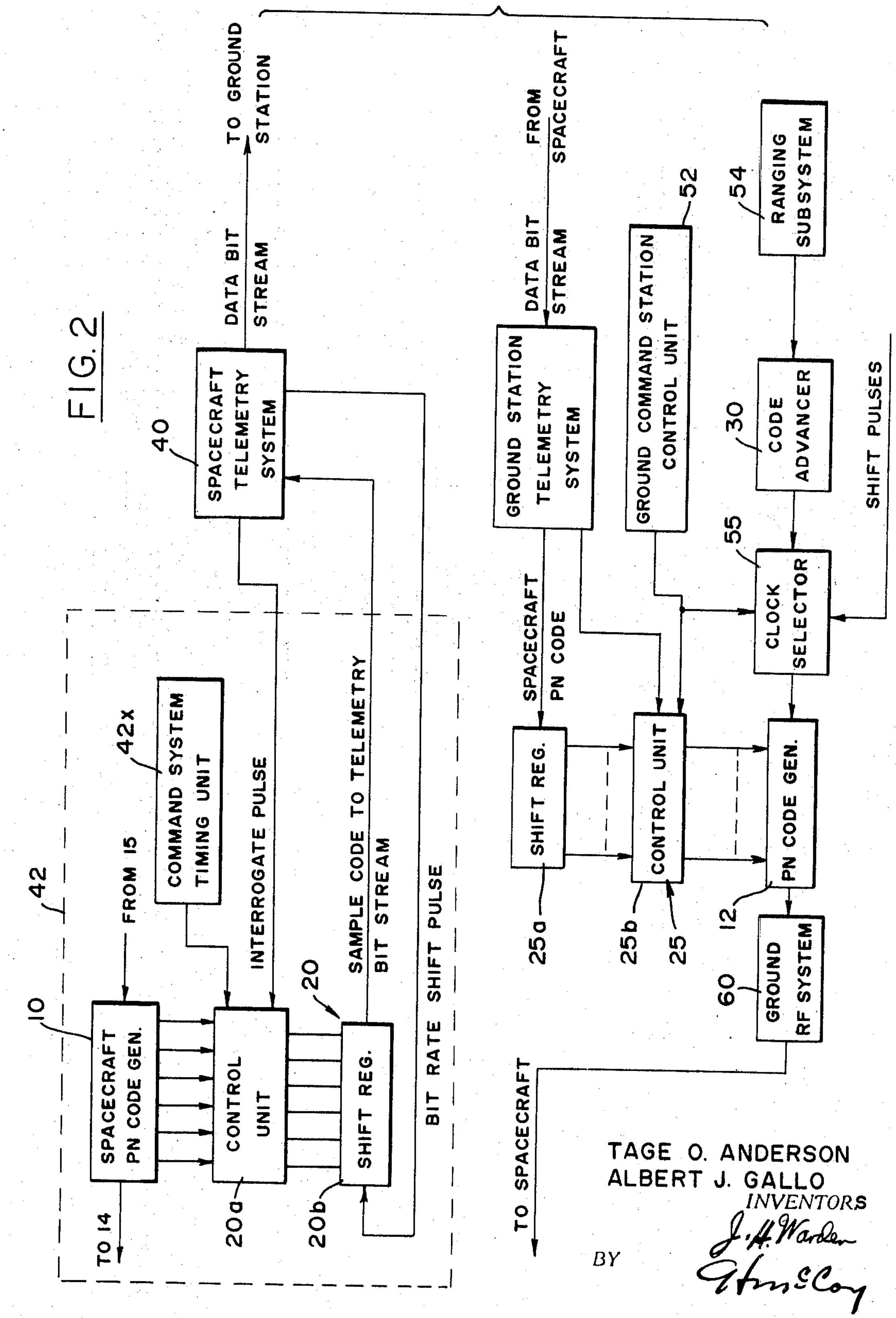
FIG. 2 is a more complete block diagram showing the arrangement of the present invention in relation to a conventional data communication system.

It should be appreciated that in light of the foregoing described functions of units 20 and 25 and advancer 30, more than one combination of circuits may be implemented to perform these desired functions. Since the scope of the invention is not intended to be limited to specific circuitry, but rather to an arrangement which contains elements, such as the two units (20 and 25) and the advancer 30, to perform the desired functions, the elements are shown in FIG. 1 in block form. However, to further explain the invention, an arrangement, actually reduced to practice for use in a space exploration communication system, is diagrammed in FIG. 2, to which reference is made herein. In FIG. 2, elements like those shown in FIG. 1 are designated by like numerals.

The particular embodiment is assumed to be incorporated in a data communication system which includes a spacecraft telemetry system 40 which serves a plurality of channels or systems, and a command system 42. The code generator 10 and the sampling unit 20 form part of the command system 42 which includes a timing unit 42*x*. The sampling unit 20 is shown comprising a control unit 20*a* and a shift register 20*b*.

Basically, in the system diagrammed in FIG. 2, the sequence of events to obtain phase-lock starts when at a proper time in the operation of system 40 an interrogate pulse is supplied by the latter to control unit 20*a*. The function of unit 20*a* is to transfer, in parallel, the code in generator 10 to shift register 20*b*. To prevent the sampling of generator 10 during a transition time in command system 42, the actual actuation of unit 20*a* occurs only when a timing pulse from timing unit 42*x* of system 42 is supplied, in addition to the interrogate pulse from the telemetry system 40. The shift register 20*b* is clocked out by shift pulses from the system 40 at the telemetry bit rate. The sampled code, clocked out of register 20*b*, is transmitted to the ground station in the data bit stream from the spacecraft telemetry system 40.

At the ground station the data bit stream with the sampled spacecraft PN code is received by a telemetry system 50. The sampled code is shifted into a shift register 25*a*, which together with control unit 25*b*, forms a sample storing unit 25. Upon completion of the clocking of the sampled code into register 25*a*, a timing pulse is supplied to the control unit 25*b*. Then, when an enable pulse from a ground command station control unit 52 is supplied to unit 25*b*, it sets the code generator 12 with the sampled code in register 25*a*. Thus, at this stage of operation the PN code in generator 12 represents the sampled PN code from the spacecraft at the sampling instant.

The ground station also includes the code advancer 30, which, in FIG. 2, is shown connected to a ranging subsystem 54. The function of the latter is to supply advancer 30 with a signal or signals representing the signal round trip (from spacecraft to ground and back) propagation time. The time delay due to signal processing, which could be either estimated or measured, may be preset in the advancer. The enabling signals supplied by unit 52 to control unit 25*b* is also supplied to a clock selector 55, which enables the high frequency clocking signals from advancer 30 to be supplied to generator 12, in order to advance the PN code therein.

After the PN code is properly advanced, it is clocked out of generator 12 for transmission to the spacecraft via a ground R.F. system 60. Shift pulses or signals may be supplied to generator 12 through clock selector 55.

From the foregoing it is thus seen that by utilizing the present invention the phase of the PN code, transmitted to the spacecraft, is not arbitrary or independent of the phase of the PN code in the spacecraft, a situation which is generally responsible for long sync-acquisition time. Rather, in accordance with the teachings disclosed herein, the phase of the ground PN code, transmitted to the spacecraft, is made to be a function of the phase of the PN code in the spacecraft, as determined by the sampled code received therefrom. Thus, by proper advance of the sampled code in the ground station, the phase of the PN code which is transmitted therefrom is controlled, so that when it arrives at the spacecraft it is substantially in phase, with the PN code generated therein.

It should be pointed out that since the arrangement disclosed herein enables the sampling of the PN code in the spacecraft, it can be used to repeatedly sample the spacecraft code and thereby observe changes in the phase of spacecraft code as synchronization is achieved. It should again be stressed that the particular arrangement shown in FIG. 2 is but one example of the implementation of the teachings of the invention.

Although particular embodiments of the invention have been described and illustrated herein, it is recognized that modifications and variations may readily occur to those skilled in the art and consequently it is intended that the claims be interpreted to cover such modifications and equivalents.

What is claimed is:

1. In a data communication system for communicating data between a first moving station and a second stationary station, each station including code generating means for generting a PN code therein, an arrangement for reducing synchronization-acquisition time comprising:

first means in said first station for receiving a PN code transmitted thereto from said second station;

second means in said first station for correlating the received PN code with the PN code generated therein;

third means in said first station responsive to said second means for controlling the phase of the code generated therein as a function of its correlation with said received code;

fourth means in said first station for sampling the phase of the PN code generated therein and for communicating it to said second station;

fifth means in said second station for setting the phase of the PN code generated therein to correspond to the phase of the sampled code communicated thereto from said first station; and sixth means in said second station for advancing the phase of the set code therein, prior to communicating it to said first station, as a function of at least the varying distance between the two stations.

2. The arrangement as recited in claim 1 wherein said sixth means advances said set code as a function of at least the propagation time of the sampled code from said first to said second station and the propagation time of the advanced code communicated from said second to said first station.

3. The arrangement as recited in claim 2 wherein said sixth means advances said set code with clocking signals whose number is a function of the number of symbols N, in said selected PN code, multiplied by a value $T_f=T-T_z$, where T represents the round trip code propagation time and code processing time and $T_z$ is an integer number of seconds, said code having a period of one second.

4. The arrangement as recited in claim 1 wherein said fourth means consists of a first shift register of N bits and a first control unit coupled to said first shift register for controlling the transfer thereto of a sample of the PN code, generated in said first station.

5. The arrangement as recited in claim 4 wherein said fifth means comprises a second shift register and a second control unit for controlling the transfer of the sample code, received by said second shift register, to the code generating means in said second station.

6. In a data communication system for communicating data between first and second stations, said system including in said first station means for correlating a pseudo-noise (PN) code generated therein and a pseudo-noise (PN) code received thereat and for controlling the phase of the generated code as a function of the correlation, the two codes being initially at a random phase relationship, to obtain synchronizing signals when said codes are in phase, an arrangement for reducing the time required to obtain initial synchronizing signals comprising:

a first PN code generator in said first station for providing a PN code of a preselected bit sequence and period;

first means in said first station for sampling at a selected time, the code in said first generator and for communicating the sampled code to said second station;

a second PN code generator in said second station for providing a PN code of said preselected bit sequence and period;

second means in said second station for receiving the sampled code transmitted from said first station and for setting said second generator with it;

control means for advancing the code in said second generator as a function of sample code processing and two way signal propagation time between said first and second stations; and transmitting means in said second station for transmitting the advanced code to said first station for correlation therein with the code provided by said first generator.

7. The arrangement as recited in claim 6 wherein said first and second stations represent a moving spacecraft and a ground station respectively and said two way propagation time substantially equals the time required for signals to propagate from the spacecraft to the ground station and back to the spacecraft.

References Cited

UNITED STATES PATENTS

| | | | |
|---|---|---|---|
| 3,167,770 | 1/1965 | Doherty et al. | 178—69.5X |
| 3,244,808 | 4/1966 | Roberts | 325—42X |
| 3,305,636 | 2/1967 | Webb | 325—419X |
| 3,350,644 | 10/1967 | McNair | 325—42X |
| 3,453,592 | 7/1969 | Ishii et al. | 325—58X |

ROBERT L. GRIFFIN, Primary Examiner

R. S. Bell, Assistant Examiner